(12) United States Patent
Madaiah

(10) Patent No.: US 9,986,535 B2
(45) Date of Patent: *May 29, 2018

(54) METHOD AND SYSTEM FOR MANAGING MOBILE MANAGEMENT ENTITY (MME) IN A TELECOMMUNICATION NETWORK

(71) Applicant: TEJAS NETWORKS LIMITED, Bangalore, Karnataka (IN)

(72) Inventor: Vinod Kumar Madaiah, Karnataka (IN)

(73) Assignee: Tejas Networks Limited, Bangalore (IN)

(*) Notice: Subject to any disclaimer, the term of this patent is extended or adjusted under 35 U.S.C. 154(b) by 216 days.

This patent is subject to a terminal disclaimer.

(21) Appl. No.: 13/854,772

(22) Filed: Apr. 1, 2013

(65) Prior Publication Data

US 2013/0258943 A1    Oct. 3, 2013

(30) Foreign Application Priority Data

Mar. 31, 2012    (IN) .......................... 1287/CHE/2012

(51) Int. Cl.
*H04W 74/08*    (2009.01)
*H04W 72/04*    (2009.01)
*H04W 24/02*    (2009.01)
*H04W 84/04*    (2009.01)

(52) U.S. Cl.
CPC ........... *H04W 72/04* (2013.01); *H04W 24/02* (2013.01); *H04W 84/047* (2013.01)

(58) Field of Classification Search
CPC ........................ H04W 76/023; H04W 74/0833

USPC .......................................................... 370/328
See application file for complete search history.

(56) References Cited

U.S. PATENT DOCUMENTS

| | | | |
|---|---|---|---|
| 8,406,192 B2 * | 3/2013 | Cai .................. | H04W 36/0033 370/315 |
| 8,817,690 B2 * | 8/2014 | Huang et al. .................. | 370/315 |
| 9,672,527 B2 * | 6/2017 | M ......................... | H04W 76/022 |
| 2010/0103857 A1 * | 4/2010 | Ulupinar et al. ............. | 370/313 |
| 2010/0260096 A1 * | 10/2010 | Ulupinar .............. | H04B 7/2606 370/315 |
| 2010/0265915 A1 * | 10/2010 | Sun et al. ..................... | 370/331 |
| 2011/0044249 A1 * | 2/2011 | Wu et al. ...................... | 370/328 |
| 2011/0185397 A1 * | 7/2011 | Escott .................... | H04B 7/155 726/3 |
| 2011/0314289 A1 * | 12/2011 | Horn et al. ................... | 713/175 |

(Continued)

*Primary Examiner* — Edan Orgad
*Assistant Examiner* — Emmanuel Maglo
(74) *Attorney, Agent, or Firm* — Oliff PLC

(57) ABSTRACT

The present invention relates to a method and system for managing MME in a telecommunication network. In one embodiment this is accomplished by receiving the bearer resource request message at the MME_UE from the UE, wherein the bearer resource request message is corresponding to the UE's original bearer resource request, inspecting the received message by the MME_UE in order to identify presence of RN_ID, if any, requesting to receive by the MME_UE from the MME_RNs for RN's 'management context information' wherein management context includes all information that enables taking over the function of MME_RN by the MME_UE and consolidating the MME_UE and MME_RNs function within the MME as MME_UE_RNs, so that for all future response to the received request will be managed by MME_UE_RN.

9 Claims, 4 Drawing Sheets

(56) References Cited

U.S. PATENT DOCUMENTS

| | | | |
|---|---|---|---|
| 2011/0317617 A1* | 12/2011 | Sun et al. .................... 370/315 |
| 2012/0002537 A1* | 1/2012 | Bao .................. H04W 24/04 370/221 |
| 2013/0273890 A1* | 10/2013 | Du ...................... H04W 4/08 455/411 |
| 2014/0226559 A1* | 8/2014 | Jactat ............... H04W 36/0055 370/315 |
| 2014/0349570 A1* | 11/2014 | Pan .................. H04B 7/15507 455/11.1 |

* cited by examiner

METHOD AND SYSTEM FOR MANAGING MOBILE MANAGEMENT ENTITY (MME) IN A TELECOMMUNICATION NETWORK

This application claims benefit of Serial No. 1287/CHE/2012, filed 31 Mar. 2012 in India and which application is incorporated herein by reference. To the extent appropriate, a claim of priority is made to the above disclosed application.

FIELD OF THE INVENTION

The invention generally relates to wireless communications, and more particularly to setting up an EPS bearer by transmitting a bearer resource request message from a UE to a mobility management entity over a plurality of relay node in a LTE network.

BACKGROUND OF THE INVENTION

User equipment (UE) or a user terminal may operate in a wireless communication network that provides high-speed data communications using various network configurations and/or Radio Access Technologies (RATs). For example, the UE may operate in accordance with Global System for Mobile Communications (GSM) and General Packet Radio Service (GPRS) technologies. Today, such a UE may further operate in accordance with Enhanced Data rates for GSM Evolution (EDGE), or Enhanced GPRS (EGPRS) or Enhanced GPRS Phase 2 (EGPRS2). Other wireless networks that UEs may operate include but are not limited to CDMA, UMTS, E-UTRAN, WiMax, and WLAN (e.g. IEEE 802.11). UEs may also operate in fixed network environments such as xDSL, DOCSIS cable networks, Ethernet or optical networks. Some UEs may be capable of multimode operation where they can operate on more than one access network technology either on a single access network technology at a time or in some devices using multiple access network technologies simultaneously.

In wireless telecommunications systems, transmission equipment in a base station transmits signals throughout a geographical region known as a cell. As technology has evolved, more advanced equipment has been introduced that can provide services that were not possible previously. This advanced equipment might include, for example, an evolved universal terrestrial radio access network (E-UTRAN) node B (eNB) rather than a base station or other systems and devices that are more highly evolved than the equivalent equipment in a traditional wireless telecommunications system. Such advanced or next generation equipment may be referred to herein as long-term evolution (LTE) equipment, and a packet-based network that uses such equipment can be referred to as an evolved packet system (EPS). As used herein, the term "access device" may refer to any component, such as a traditional base station, eNB, or other LTE access device, that can provide a UE with access to other components in a telecommunications system.

In some deployment scenario, a UE is connected to a core network via plurality of Relay Nodes and eNodeB. The UE making a request to the MME lets say MME_UE for setting up an EPS Bearer in order to start the communication. The EPS Bearer request arrives at MME; this MME could be of UE or of one of the Relay Nodes.

In order for UE to get an EPS bearer, all Relay nodes must have their own EPS bearers that has sufficient resource to admit EPS bearer connection of UE, if RN has sufficient resource then MME_RN will not provision additional resource and if RN does not have sufficient resource then MME_RN will provision additional resource by responding to the request either directly to RN or to MME_UE.

The MME who received the EPS bearer request corresponding to the UE will have to optimally send EPS bearer request to MME of the Relay Nodes on behalf of the Relay Nodes also.

Thus, whenever a UE bearer is created or modified, the RN bearer modify or create procedures may be initiated by the RN. This increases the exchange of messages separately for the UE and for the RN to modify/create a new bearer. Thus additional messages may be exchanged by the RN each time a bearer is created/modified for the UE, leading to delayed access service and as well as backhaul bandwidth is wasted or underutilized. Normally, MME for UE (MME_UE) and MME for RN (MME_RN) are selected independently. So often there are two different MMEs, physically separated. For every request originated from the UE or RN, the MME i.e. MME_UE and MME_RN are involved which leads to delay in responding the request and further which leads to complexity and congestion in the network path.

Thus there is a need for proficient method and system of transmitting a bearer resource request message from a UE over a plurality of relay node to a mobility management entity for setting up an EPS bearer in an LTE Network.

SUMMARY OF THE INVENTION

An aspect of the present invention is to address at least the above-mentioned problems and/or disadvantages and to provide at least the advantages described below.

Accordingly, an aspect of the present invention is to provide a method of transmitting a bearer resource request message from a UE over a plurality of relay node to a mobility management entity for setting up an EPS bearer in an LTE Network, the method comprising: receiving the bearer resource request message at the MME_UE from the UE, wherein the bearer resource request message is corresponding to the UE's original bearer resource request, inspecting the received message by the MME_UE in order to identify presence of RN_ID, if any, requesting to receive by the MME_UE from the MME_RNs for RN's 'management context information' wherein management context includes all information that enables taking over the function of MME_RN by the MME_UE and consolidating the MME_UE and MME_RNs function within the MME as MME_UE_RNs, so that for all future response to the received request will be managed by MME_UE_RN.

In another aspect of the present invention is to provide a system of transmitting a bearer resource request message from a UE over a plurality of relay node to a mobility management entity for setting up an EPS bearer in a LTE Network, the system comprising: at least one UE, a plurality of Relay Nodes, at least one enode B and a mobile management entity includes a processor configured for receiving the bearer resource request message at the MME_UE from the UE, wherein the bearer resource request message is corresponding to the UE's original bearer resource request, inspecting the received message by the MME_UE in order to identify presence of RN_ID, if any, requesting to receive by the MME_UE from the MME_RNs for RN's 'management context information' wherein management context includes all information that enables taking over the function of MME_RN by the MME_UE and consolidating the MME_UE and MME_RNs function within the MME as MME_UE_RNs, so that for all future response to the received request will be managed by MME_UE_RN.

In another aspect of the present invention is to provide a node, comprising a processor including a memory and a network protocol module coupled to the processor, wherein the processor is configured for: receiving the bearer resource request message at the MME_UE from the UE, wherein the bearer resource request message is corresponding to the UE's original bearer resource request, inspecting the received message by the MME_UE in order to identify presence of RN_ID, if any, requesting to receive by the MME_UE from the MME_RNs for RN's 'management context information' wherein management context includes all information that enables taking over the function of MME_RN by the MME_UE and consolidating the MME_UE and MME_RNs function within the MME as MME_UE_RNs, so that for all future response to the received request will be managed by MME_UE_RN.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings in which.

Figure 1:
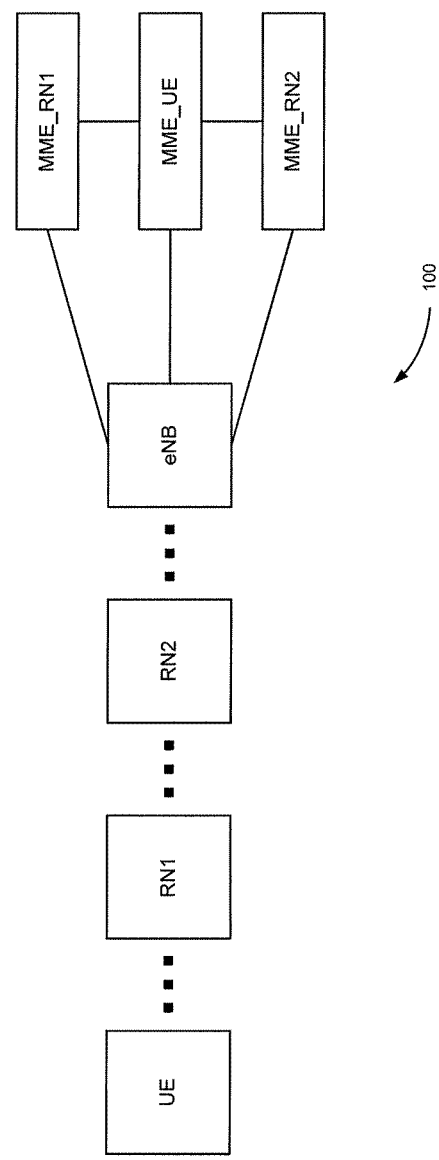
FIG. 1 is a block diagram of a system of transmitting a bearer resource request message from a UE over a plurality of relay node to a mobility management entity for setting up an EPS bearer in a LTE Network.

Persons skilled in the art will appreciate that elements in the figures are illustrated for simplicity and clarity and may have not been drawn to scale. For example, the dimensions of some of the elements in the figure may be exaggerated relative to other elements to help to improve understanding of various exemplary embodiments of the present disclosure.

DETAIL DESCRIPTION OF THE INVENTION

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

FIGS. 1 through 5, discussed below, and the various embodiments used to describe the principles of the present disclosure in this patent document are by way of illustration only and should not be construed in any way that would limit the scope of the disclosure. Those skilled in the art will understand that the principles of the present disclosure may be implemented in any suitably arranged communications system. The terms used to describe various embodiments are exemplary. It should be understood that these are provided to merely aid the understanding of the description, and that their use and definitions in no way limit the scope of the invention. Terms first, second, and the like are used to differentiate between objects having the same terminology and are in no way intended to represent a chronological order, unless where explicitly stated otherwise. A set is defined as a non-empty set including at least one element.

When referred to hereafter, the terminology "wireless transmit/receive unit (WTRU)" includes but is not limited to a user equipment (UE), a mobile station, a fixed or mobile subscriber unit, a pager, a cellular telephone, a personal digital assistant (PDA), a computer, or any other type of user device capable of operating in a wireless environment. When referred to hereafter, the terminology "base station" includes but is not limited to an eNodeB, a site controller, an access point (AP), or any other type of interfacing device capable of operating in a wireless environment.

While the present invention will be described fully hereinafter with reference to the accompanying drawings, in which particular embodiments are shown, it is to be understood at the outset that persons skilled in the art may modify the embodiments herein described while still achieving the desired result of this invention. Accordingly, the description which follows is to be understood as a broad informative disclosure directed to persons skilled in the appropriate arts and not as limitations of the present invention.

FIG. 1 is a block diagram of a system of transmitting a bearer resource request message from a UE over a plurality of relay node to a mobility management entity for setting up an EPS bearer in a LTE Network. As shown in figure system 100 includes a User Equipment (UE), one or more Relay Nodes (RN), enodeB, and a Mobile Management Entity (MME). The Mobile Management Entity (MME) receives a bearer resource request message at the MME_UE from one of the User Equipment (UE) within the geographical range of the serving enodeB. The bearer resource request message is corresponding to the UE's original bearer resource request. The received bearer resource request message may be first communicate to the serving Relay Node (RN) or Relay Nodes (RNs) if any. In the present example, there are two relay nodes (RN) i.e. tandem relay nodes which are serving the UE in order to communicate to enodeB i.e. Donor enodeB. The bearer resource request message which is originated at the UE has to pass through all the tandem node i.e. Relay Nodes, Donor enodeB and further to Mobile Management Entity.

During the request process originated from UE for bearer resource request, all the relay nodes through the path add a unique identifier (example: Relay Node ID or RN_ID1, RN_ID2 etc). The MME maintains database for all the Relay Nodes i.e. MME_RN1, MME_RN2 etc and the UE i.e. MME_UE.

Figure 2:
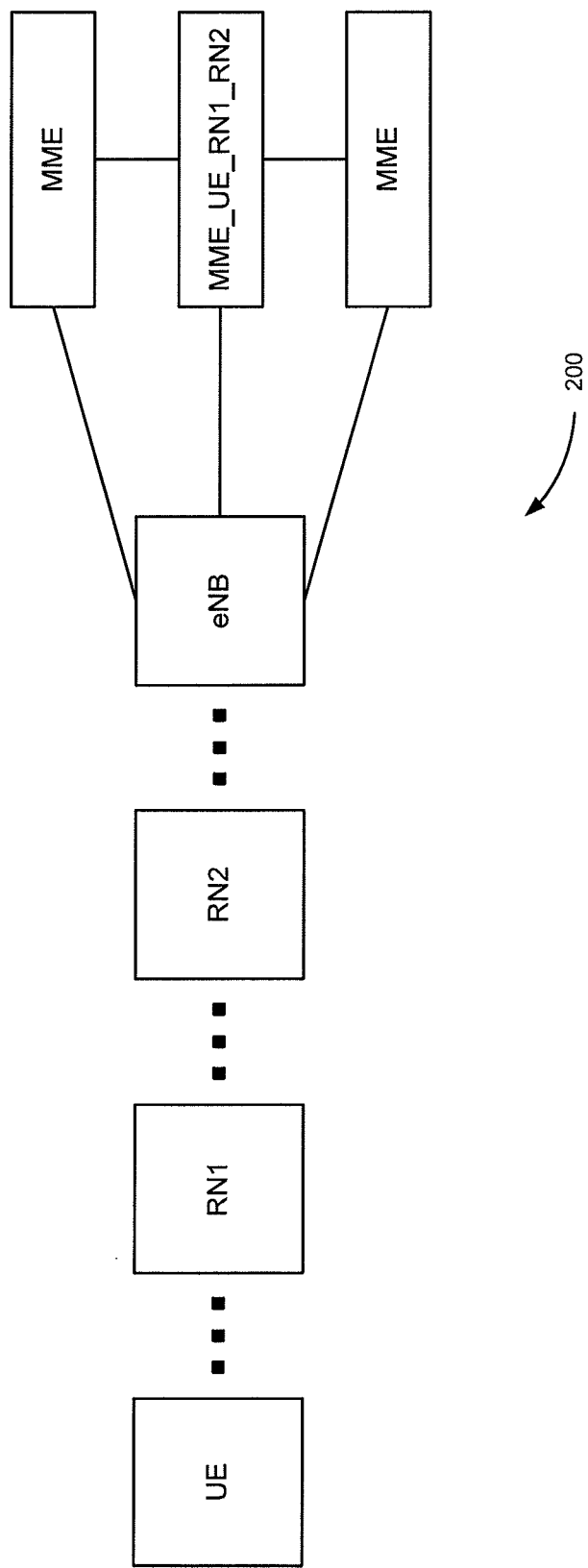
FIG. 2 is a block diagram of a system of transmitting a bearer resource request message from a UE over a plurality of relay node to a mobility management entity for setting up an EPS bearer in a LTE Network, according to one embodiment of the present invention.

FIG. 2 is a block diagram of a system of transmitting a bearer resource request message from a UE over a plurality of relay node to a mobility management entity for setting up an EPS bearer in a LTE Network, according to one embodiment of the present invention. As discussed above, the mobile management entity maintains for all the Relay Nodes i.e. MME_RN1, MME_RN2 etc and the UE i.e. MME_UE. In one example embodiment, the MME receives the bearer resource request message i.e. at the MME_UE from the UE, where the bearer resource request message is corresponding to the UE's original bearer resource request. The MME_UE inspects the received message by the MME_UE in order to identify presence of RN_ID, if any, where all the relay nodes IDs are encapsulated in the UE resource request message to MME. The MME_UE prepares to take over the function of MME_RNs by the MME_UE by requesting 'management context information' for RN's from the MME_RNs. The management context includes all information that enables taking over the function of MME_RN by the MME_UE. Upon receiving the RN's management context information by the MME_UE from the MMR_RN, it notifies all the MME_RN to terminate managing of the relay nodes in the network path of the UE once RN's management context information is received. Further, it consolidates the MME_UE and MME_RNs function within the MME as MME_UE_RNs, so that for all future response to the received request will be managed by MME_UE_RN.

Figure 3:
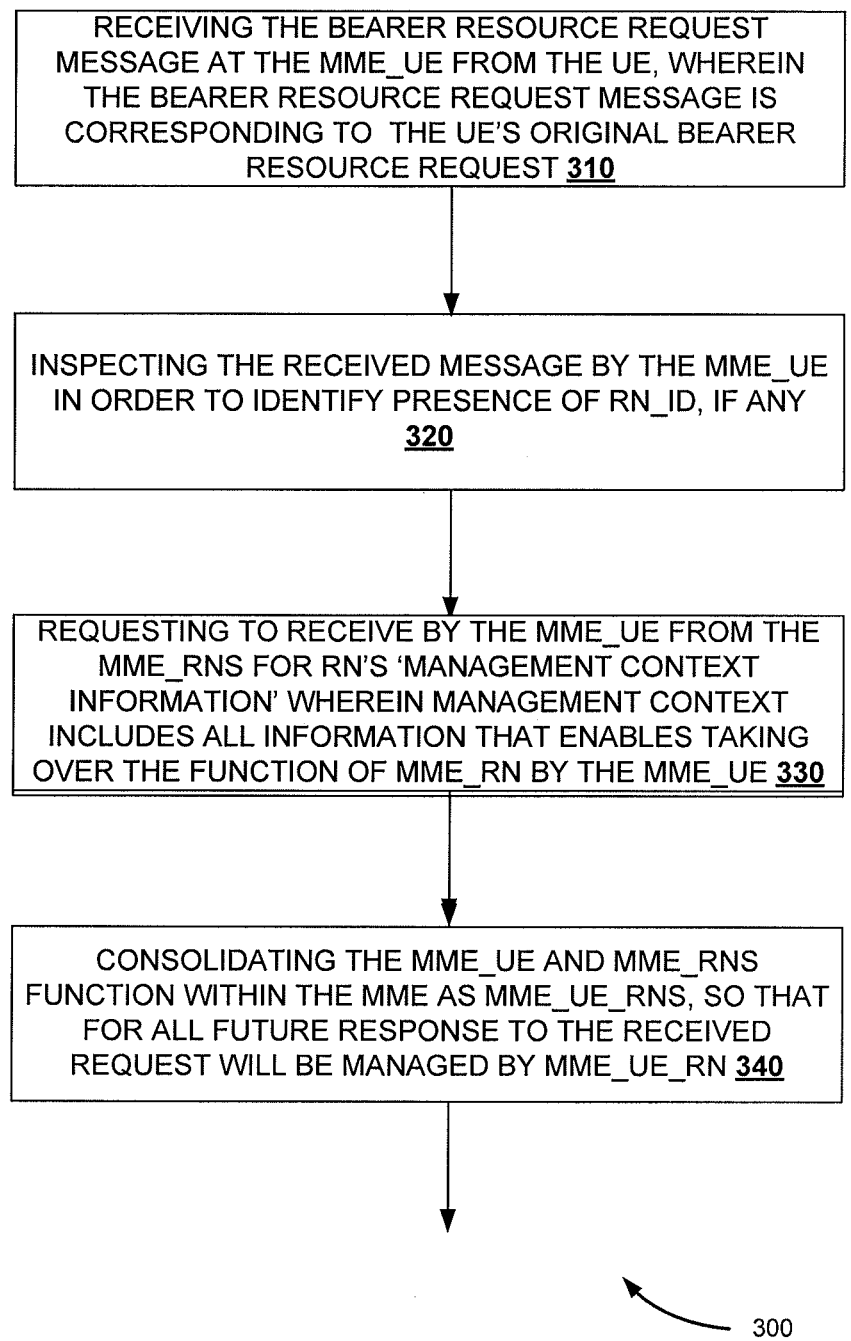
FIG. 3 shows a flow chart of a method of transmitting a bearer resource request message from a UE over a plurality of relay node to a mobility management entity for setting up an EPS bearer in a LTE Network, according to one embodiment of the present invention.

FIG. 3 shows method of transmitting a bearer resource request message from a UE over a plurality of relay node to a mobility management entity for setting up an EPS bearer in an LTE Network, according to one embodiment of the present invention.

At step 310, the method receives the bearer resource request message at the MME_UE from the UE, wherein the bearer resource request message is corresponding to the UE's original bearer resource request. The received bearer resource request message includes bearer resource request for UE and the relay node IDs. Further, the method prepares to take over the function of MME_RNs by the MME_UE.

At step 320, the method inspects the received message by the MME_UE in order to identify presence of RN_ID, if any, where all the relay nodes IDs are encapsulated in the UE resource request message to MME.

At step 330, the method requests to receive by the MME_UE from the MME_RNs for RN's 'management context information' wherein management context includes all information that enables taking over the function of MME_RN by the MME_UE.

At step 340, the method consolidates the MME_UE and MME_RNs function within the MME as MME_UE_RNs, so that for all future response to the received request will be managed by MME_UE_RN. Further, the method notifies all the MME_RN to terminate managing of the relay nodes in the network path of the UE once RN's management context information is received. The MME_UE_RN manages both UE and RN and checks if RN has the capability to support additional bearer service i.e. if MME_UE_RN knows that RN has enough resources or bandwidth to support UE's bearer request, then MME_UE_RN do not create or provision bearer for RN as there is additional bearer resource has available at the RN.

Although the method flowchart includes steps 310-340 that are arranged logically in the exemplary embodiments, other embodiments of the subject matter may execute two or more steps in parallel, using multiple processors or a single processor organized as two or more virtual machines or sub-processors. Moreover, still other embodiments may implement the steps as two or more specific interconnected hardware modules with related control and data signals communicated between and through the modules, or as portions of an application-specific integrated circuit. Thus, the exemplary process flow diagrams are applicable to software, firmware, and/or hardware implementations.

Figure 4:
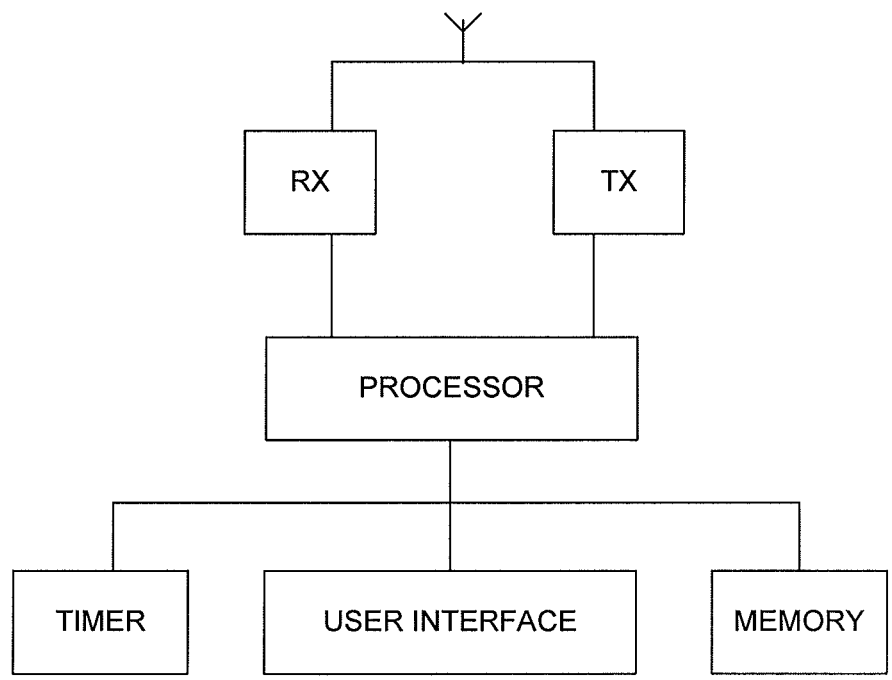
FIG. 4 is a block diagram of a user equipment of FIG. 2 in accordance with an embodiment of the present invention.

Referring now to FIG. 4, a block diagram of user equipment (UE) is provided in accordance with an embodiment of the present invention. UE includes a processor, such as one or more microprocessors, microcontrollers, digital signal processors (DSPs), combinations thereof or such other devices known to those having ordinary skill in the art, which processor is configured to execute the functions described herein as being executed by the UE. UE further includes an at least one memory device, such as random access memory (RAM), dynamic random access memory (DRAM), and/or read only memory (ROM) or equivalents thereof, that is coupled to the processor and that maintains data and programs that may be executed by the associated processor and that allows the UE to perform all functions necessary to operate in communication system.

UE further includes a user interface and timer coupled to processor. User interface provides a user of the UE with the capability of interacting with the UE, including inputting instructions into the UE and receiving audio, textual, and video messaging from the UE. In one embodiment of the present invention, user interface may include an audio speaker, an audio receiver, a display screen, and a keypad that includes multiple keys that may be used by a user of the MS to input instructions into the MS. In another embodiment of the present invention, the display screen may comprise a touch screen. Timer is used by processor to count down an access time period so that the processor can determine an amount of time remaining in an access time period and can display the remaining amount of time on user interface. UE also includes a radio frequency (RF) receiver and an RF transmitter. RF receiver and transmitter are each coupled to processor and an antenna and function to exchange RF signals with BSs serving the UE via a corresponding air interface.

Figure 5:
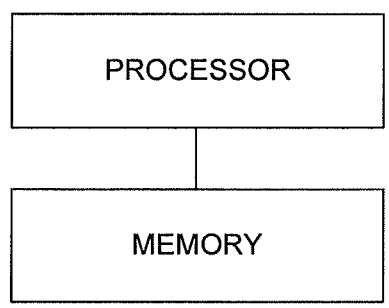
FIG. 5 is a block diagram of a Mobility Management Entity of FIG. 2 in accordance with an embodiment of the present invention.

FIG. 5 is a block diagram of MME in accordance with an embodiment of the present invention. MME include a processor, such as one or more microprocessors, microcontrollers, digital signal processors (DSPs), combinations thereof or such other devices known to those having ordinary skill in the art, which processor is configured to execute the functions described herein as being executed by the MME. MME further include an at least one memory device that may comprise random access memory (RAM), dynamic random access memory (DRAM), and/or read only memory (ROM) or equivalents thereof, that maintain data and programs that may be executed by the associated processor and that allow the MME to perform all functions necessary to operate in communication system.

At least one memory device further maintains a profile for each UE, served by, and registered with, the MME, which profile includes the capabilities of the UE. For example, when a UE registers with, that is, attaches to, network, the UE may convey its capabilities to MME or the MME may retrieve the UE's capabilities from a Home Subscriber Server (HSS) (not shown), a Home Location Register (HLR) (not shown), or Visited Location Register (VLR) (not shown) that maintains such information.

It should also be understood that elements of the present invention may also be provided as a computer program product which may include a machine-readable medium having stored thereon instructions which may be used to program a computer (e.g., a processor or other electronic device) to perform a sequence of operations. Alternatively, the operations may be performed by a combination of hardware and software. The machine-readable medium may include, but is not limited to, floppy diskettes, optical disks, CD-ROMs, and magneto-optical disks, ROMs, RAMs, EPROMs, EEPROMs, magnet or optical cards, propagation media or other type of media/machine-readable medium suitable for storing electronic instructions. For example, elements of the present invention may be downloaded as a computer program product, wherein the program may be transferred from a remote computer or telephonic device to a requesting process by way of data signals embodied in a carrier wave or other propagation medium via a communication link (e.g., a modem or network connection).

FIGS. 1-5 are merely representational and are not drawn to scale. Certain portions thereof may be exaggerated, while others may be minimized. FIGS. 1-5 illustrate various embodiments of the invention that can be understood and appropriately carried out by those of ordinary skill in the art.

In the foregoing detailed description of embodiments of the invention, various features are grouped together in a single embodiment for the purpose of streamlining the disclosure. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. Thus, the following claims are hereby incorporated into the detailed description of embodiments of the invention, with each claim standing on its own as a separate embodiment.

It is understood that the above description is intended to be illustrative, and not restrictive. It is intended to cover all alternatives, modifications and equivalents as may be included within the spirit and scope of the invention as defined in the appended claims. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein," respectively.

I claim:

1. A method of transmitting a bearer resource request message from a UE over a plurality of relay node to a mobility management entity for setting up an EPS bearer in an LTE Network, the method comprising:
   receiving the bearer resource request message at the MME_UE from the UE, wherein the bearer resource request message is corresponding to the UE's original bearer resource request;
   inspecting the received message by the MME_UE in order to identify presence of RN_ID, if any;
   requesting to receive by the MME_UE from the MME_RNs for RN's 'management context information' wherein management context includes all information that enables taking over the function of MME_RN by the MME_UE; and
   consolidating the MME_UE and MME_RNs function within the MME as MME_UE_RNs, so that for all future response to the received request will be managed by MME_UE_RN.

2. The method of claim 1, wherein the received bearer resource request message includes bearer resource request for UE and the relay node IDs.

3. The method of claim 1, further comprising:
   notifying all the MME_RN to terminate managing of the relay nodes in the network path of the UE once RN's management context information is received.

4. The method of claim 1, further comprising:
   preparing to take over the function of MME_RNs by the MME_UE.

5. The method of claim 1, wherein all the relay nodes IDs are encapsulated in the UE resource request message to MME.

6. The method of claim 1, wherein the MME_UE_RN manages both UE and RN and checks if RN has the capability to support additional bearer service.

7. A system of transmitting a bearer resource request message from a UE over a plurality of relay node to a mobility management entity for setting up an EPS bearer in a LTE Network, the system comprising:
   at least one UE;
   a plurality of Relay Nodes;
   at least one enode B; and
   a mobile management entity includes a processor configured for
      receiving the bearer resource request message at the MME_UE from the UE, wherein the bearer resource request message is corresponding to the UE's original bearer resource request;
      inspecting the received message by the MME_UE in order to identify presence of RN_ID, if any;
      requesting to receive by the MME_UE from the MME_RNs for RN's 'management context information' wherein management context includes all information that enables taking over the function of MME_RN by the MME_UE; and
      consolidating the MME_UE and MME_RNs function within the MME as MME_UE_RNs, so that for all future response to the received request will be managed by MME_UE_RN.

8. A node, comprising
   a processor including a memory; and
   a network protocol module coupled to the processor, wherein the processor is configured for:
      receiving the bearer resource request message at the MME_UE from the UE, wherein the bearer resource request message is corresponding to the UE's original bearer resource request;
      inspecting the received message by the MME_UE in order to identify presence of RN_ID, if any;

requesting to receive by the MME_UE from the MME_RNs for RN's 'management context information' wherein management context includes all information that enables taking over the function of MME_RN by the MME_UE; and consolidating the MME_UE and MME_RNs function within the MME as MME_UE_RNs, so that for all future response to the received request will be managed by MME_UE_RN.

9. The node of claim 8 is a Mobile Management Entity including MME_UE and MME_RN.

* * * * *